(12) United States Patent
Chiang

(10) Patent No.: US 9,143,174 B2
(45) Date of Patent: Sep. 22, 2015

(54) WIRELESS MOUSE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Hsiao-Lung Chiang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 105 days.

(21) Appl. No.: 13/974,509

(22) Filed: Aug. 23, 2013

(65) Prior Publication Data

US 2014/0213211 A1 Jul. 31, 2014

(30) Foreign Application Priority Data

Jan. 25, 2013 (CN) .......................... 2013 1 0030647

(51) Int. Cl.
*G06F 3/033* (2013.01)
*H04B 1/08* (2006.01)

(52) U.S. Cl.
CPC ........................ *H04B 1/08* (2013.01)

(58) Field of Classification Search
CPC .................... G06F 3/03543; G06F 2203/0384; G06F 3/038; G06F 3/039; G06F 3/033; G06F 1/169
USPC ................................................... 345/163, 157
See application file for complete search history.

(56) References Cited

U.S. PATENT DOCUMENTS

| 8,717,296 | B2 * | 5/2014 | Wu | 345/163 |
| 2006/0044270 | A1 * | 3/2006 | Chen | 345/163 |
| 2006/0238507 | A1 * | 10/2006 | Chang | 345/163 |
| 2007/0296697 | A1 * | 12/2007 | Chen | 345/158 |
| 2011/0115708 | A1 * | 5/2011 | Lee | 345/163 |

* cited by examiner

*Primary Examiner* — Koosha Sharifi-Tafreshi
(74) *Attorney, Agent, or Firm* — Li & Cai Intellectual Property (USA) Office

(57) ABSTRACT

A wireless mouse suitable for accommodating a receiver is disclosed. The wireless mouse comprises a mouse body, and a cover shell. The mouse body includes an upper casing, and a lower casing fixed to the upper casing. The lower casing has a receiving portion. The cover shell selectively covers the lower casing. The receiver is removably fixed on the cover shell corresponding to the position of the receiving portion. When the receiver is fixed on the cover shell and the cover shell covers the lower casing, the receiver is accommodated in the receiving portion.

6 Claims, 11 Drawing Sheets

WIRELESS MOUSE

BACKGROUND OF THE INVENTION

1. Field of the Invention

The present disclosure relates to a wireless mouse; in particular, to a wireless mouse suitable for accommodating a receiver.

2. Description of Related Art

With the advancement of technology, desktop or laptop computers, or even tablet computers or other portable computer devices have become indispensable tools in daily lives and workplaces. The mouse is a common input device for the above devices. Particularly, wired mouses have evolved to wireless mouses, doing away with the limitations of a wired mouse. A wireless mouse includes, in addition to a mouse main body, a wireless receiver which can be plugged into the above devices. When the receiver is not in use, it is usually stored with the wireless mouse to avoid being lost.

However, conventional receivers are mostly stored within the body of the mouses, and require the user to apply the index finger and the thumb to grip the receiver to insert it into the body of the mouse. When the receiver is to be used, the user needs to use fingers to take out the receiver from the body of the mouse. These processes create inconvenience during storage and removal of the receiver.

SUMMARY OF THE INVENTION

The object of the present disclosure is to provide a wireless mouse suitable for accommodating a receiver in a convenient manner.

In order to achieve the aforementioned object, the present disclosure provides a wireless mouse which includes a mouse body having an upper casing and a lower casing fixed to the upper casing and having a receiving portion; a cover shell selectively closed upon the lower casing such that the receiver is selectively fixed to the cover shell and corresponds to the position of the receiving portion. When the receiver is retained on the cover shell and the cover shell is closed upon the lower casing, the receiver is accommodated within the receiving portion.

Therefore, the wireless mouse of the present disclosure can accommodate a receiver on the cover shell, thereby storing it within the mouse body, and when the cover shell is not closed upon the mouse body, the receiver is exposed on the cover shell to be picked up by the user.

BRIEF DESCRIPTION OF THE DRAWINGS

FIG. 8A shows a see-through diagram of the fourth engagement portion engaged to the third engagement portion;

FIG. 8B shows a see-through diagram of the fourth engagement portion disengaged from the third engagement portion;

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings. The words "first" and "second" serve to distinguish elements or structures and are not limiting nomenclature. Therefore, without exceeding the scope of the embodiments, the following first element, portion and structure can also be named the second element, portion and structure. Additionally, the amounts mentioned by the embodiments are not meant to limit the present invention.

Figure 1:
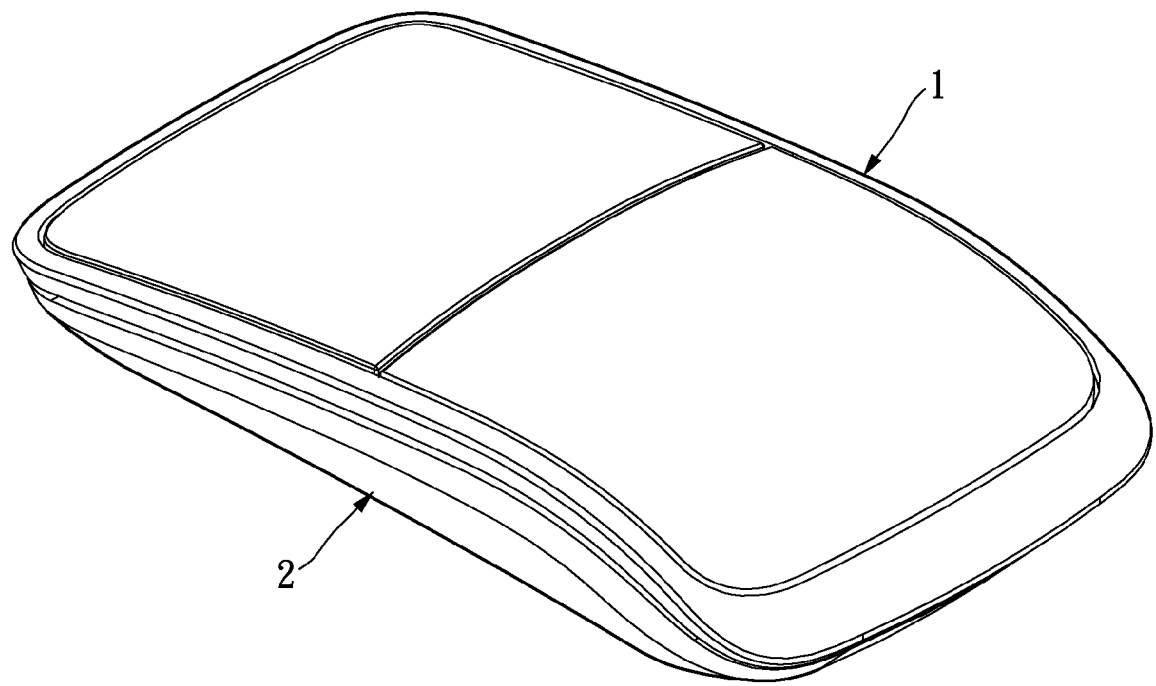
FIG. 1 shows a perspective diagram of a wireless mouse according to the present disclosure.
Figure 3:
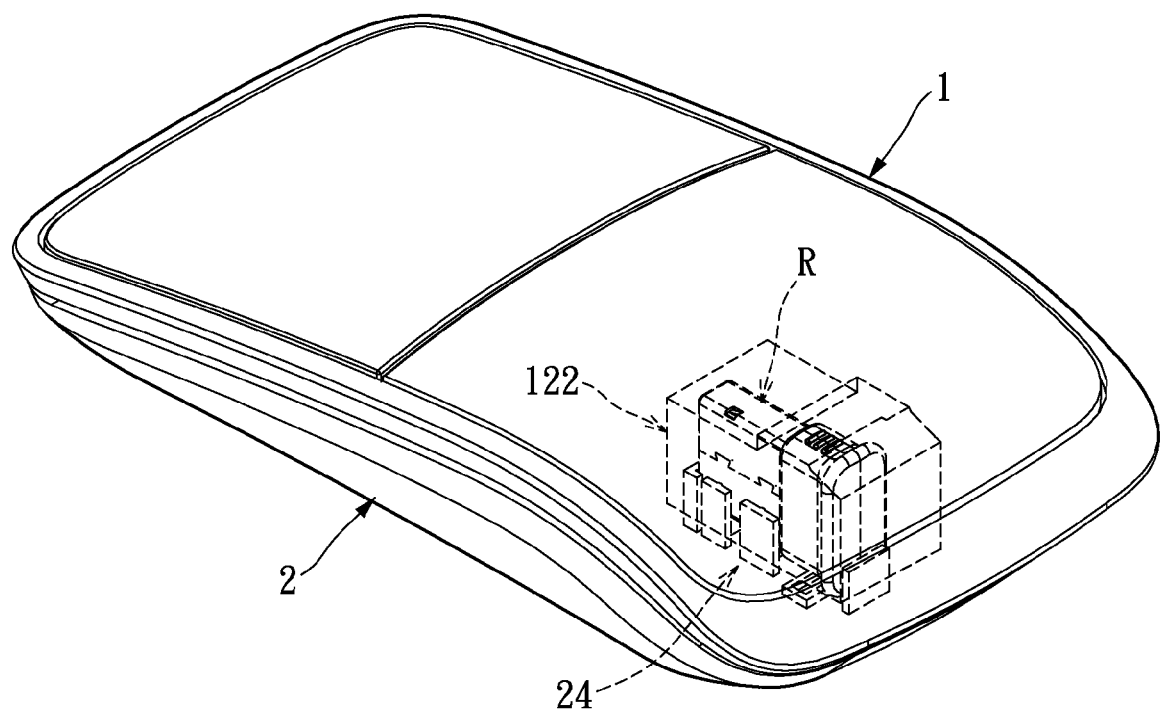
FIG. 3 shows a see-through diagram of a receiver accommodated within a wireless mouse according to the present disclosure.
Figure 4:
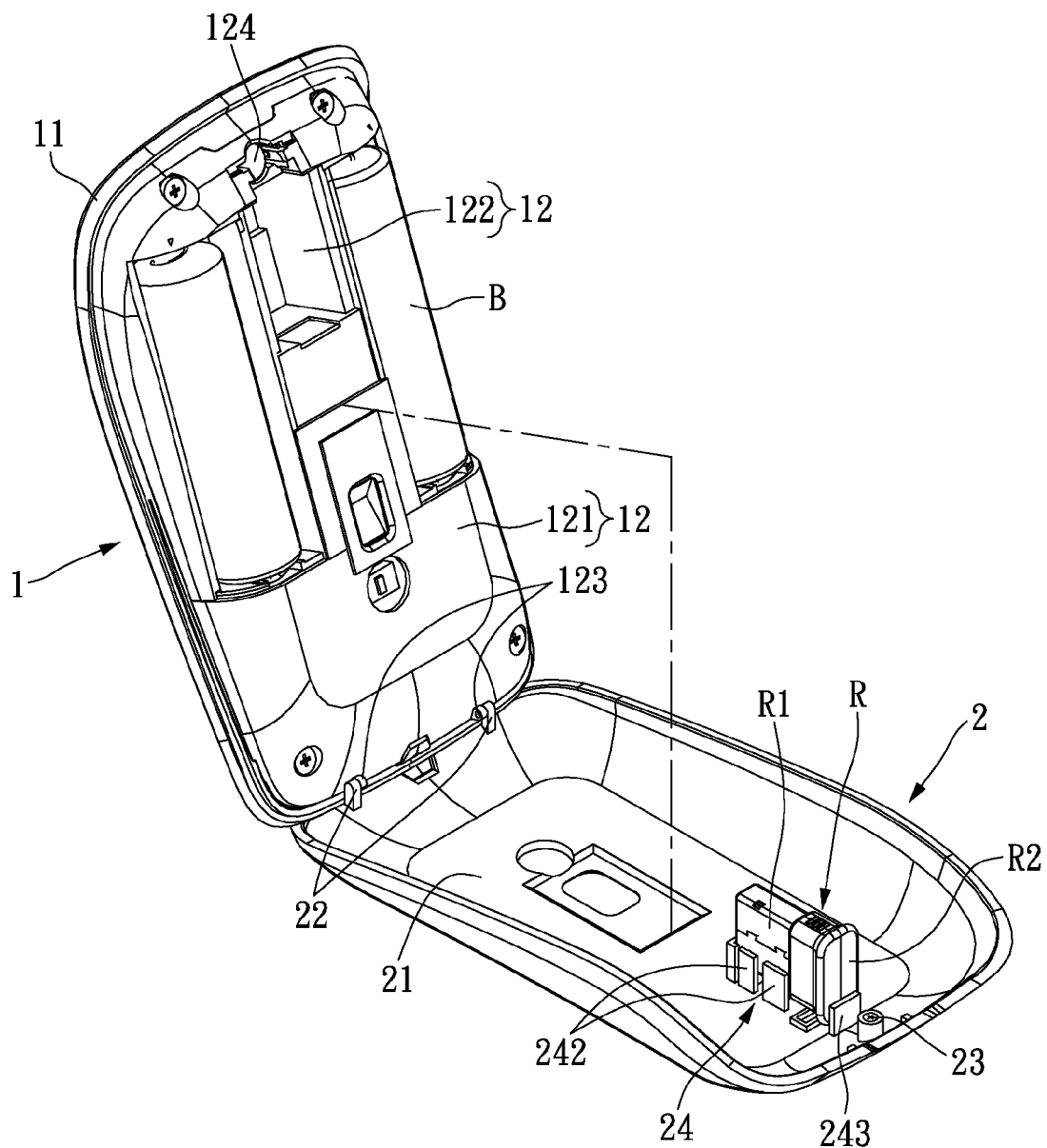
FIG. 4 shows a perspective assembly diagram of a first embodiment according to the present disclosure.

FIG. 1 shows a perspective diagram of a wireless mouse of the present disclosure. Concurrently referring to FIG. 2 to FIG. 4, the present disclosure provides a wireless mouse suitable for accommodating a receiver R. The wireless mouse includes a mouse body 1 and a cover shell 2. The mouse body 1 includes an upper casing 11 and a lower casing 12. The lower casing 12 is fixed under the upper casing 11. The lower casing 12 has a depressed receiving portion 122. It is worth noting that the mouse body 1 further includes other components such as an optical module, a touch control module, a scroll wheel, buttons and other elements for controlling the cursor, and components for providing power supply, which are not further detailed herein. The cover shell 2 is a single integrated body with a curve shape and corresponds to the structure of the lower casing 12. The cover shell 2 is selectively closed upon the lower casing 12 to shield power source B, and forms a single integrated body with the mouse body 1 appearance-wise (as shown in FIG. 1). The receiver R is selectively fixed on the cover shell 2 and corresponds to the position of the receiving portion 122. In the present embodiment, the specification of the receiver can be for example USB Nano Dongle, therefore having a flat rectangular mating portion R1, and a pick-up portion R2 slightly larger than the mating portion R1. When the receiver R is fixed to the cover shell 2 and the cover shell 2 is closed upon the lower casing 12, the receiver R is accommodated within the receiving portion 122 (as shown in FIG. 3). When the cover shell 2 does not cover the lower casing 12, the receiver R located on the cover shell 2 is exposed for the user to pick up (as shown in FIG. 4).

Figure 2:
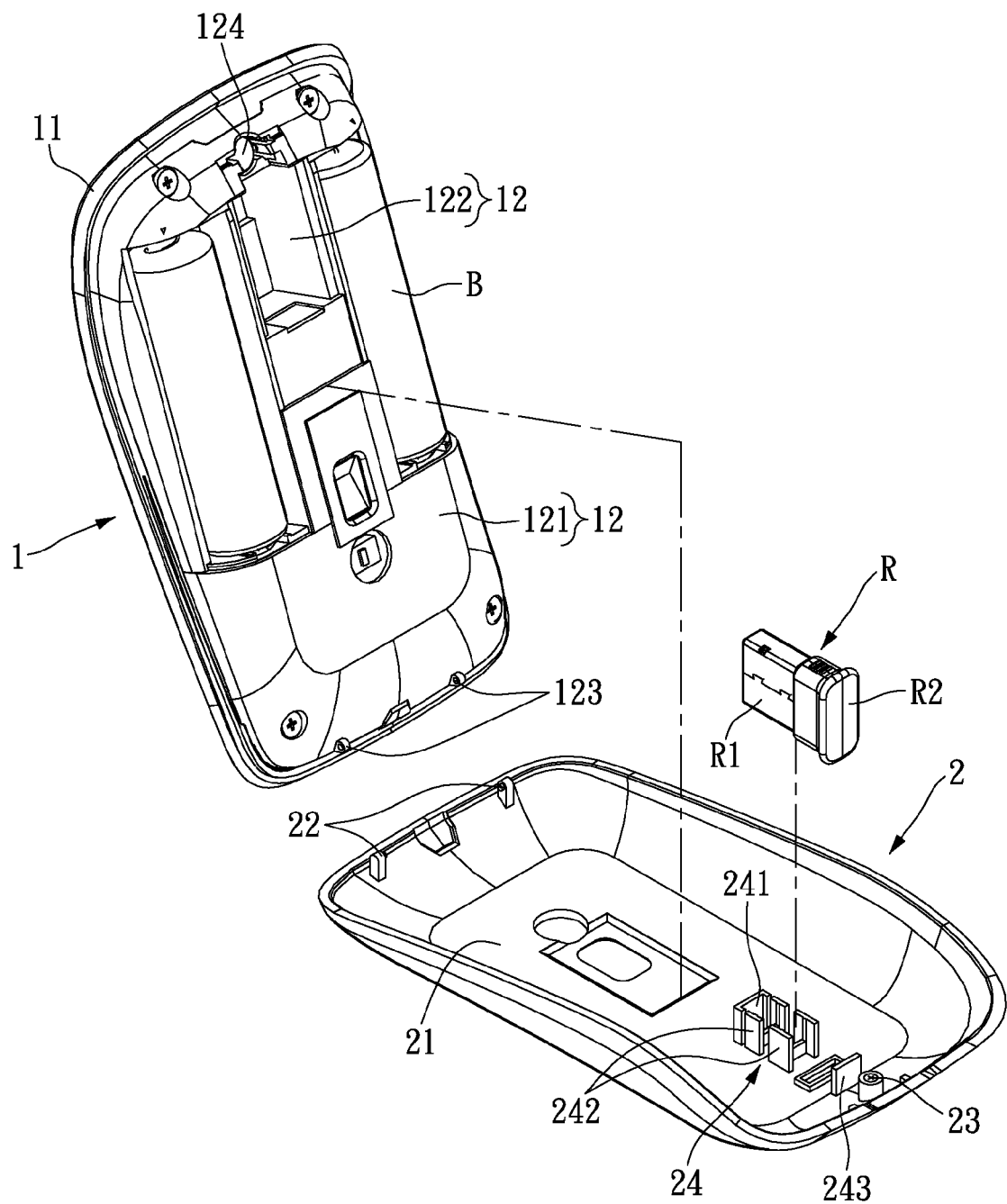
FIG. 2 shows a perspective exploded diagram of a first embodiment of a wireless mouse according to the present disclosure.

In more detail, as shown in FIG. 2, one end (the front end in this case) of an outer surface 121 of the lower casing 12 has a first pivot portion 123, and the other end (the rear end in this case) of the same has a first attaching portion 124. One end of an inner surface 21 of the cover shell 2 has a second pivot portion 22 corresponding to the position of the first pivot portion 123, and the other end of the inner surface 21 of the cover shell 2 has a second attaching portion 23 corresponding to the position of the first attaching portion 124. The first pivot portion 123 can be a shaft hole or a C-shaped fastener. The second pivot portion 22 can be a pivoting element such as a protruding shaft or a rotating shaft. The protruding shaft can pivot about the shaft hole, and the rotating shaft can pivot on the C-shaped fastener, such that the second pivot portion 22 can pivot on the first pivot section 123 to form a pivot structure. The first attaching portion 124 can be a magnet, and the second attaching portion 23 can be a metal element such as a metal plate or a screw, or also a magnet, such that the second attaching portion 23 can be attached to the first attaching portion 124 by magnetic attraction, to form a magnetically attracting structure. In the present embodiment, the first pivot portion 123 is embodied by two shaft holes, and the second pivot portion 22 is embodied by two protruding shafts; the first attaching portion 124 is embodied by a magnet, and the second attaching portion is embodied by a screw. However the amount of each component mentioned above is not limited. The cover shell 2 can be rotably closed upon the outer surface 121 of the lower casing 12 by the correspondence between the second pivot portion 22 and the first pivot portion 123 and the correspondence between the second attaching portion 23 and the first attaching portion 124.

Moreover, the inner surface 21 of the cover shell 2 further has a retaining structure 24 for retaining the receiver R. Namely, the inner surface 21 of the cover shell 2 has a substantially U-shaped upright wall 241, four side walls 242 arranged on two sides of the upright wall 241, and a retaining wall 243 arranged perpendicular to the side walls 242 and further from the upright wall 241. The distance between the side walls 242 corresponds to the width of the mating portion R1 of the receiver R. The length between the upright wall 241 and the retaining wall 243 corresponds to the length of the receiver R. The receiver R can be clasped by these walls, such that the receiver R can be retained on the inner surface 21 of the cover shell 2. The abovementioned form and structure of the retaining structure 24 is not limited, and can be modified according to the specification of the receiver R. The retaining structure 24 corresponds to the position of the receiving portion 122, such that the receiver R corresponds to the position of the receiving portion 122. In other words, when the receiver R is retained on the retaining structure 24 and fixed on the inner surface 21 of the cover shell 2, and the cover shell 2 is rotably closed upon the outer surface 121 of the lower casing 12, the receiver R is accommodated within the receiving portion 122 (as shown in FIG. 3). When the user intends to use the receiver R, the cover shell 2 can be rotated downward relative to the lower casing 12 of the mouse body 1 (namely away from the lower casing 12), such that the second attaching portion 23 is released from the first attaching portion 124. Then, the receiver R can be removed from the retaining structure 24 on the inner surface 21 of the cover shell 2 in a manner that is convenient for the user (as shown in FIG. 4).

Figure 5:
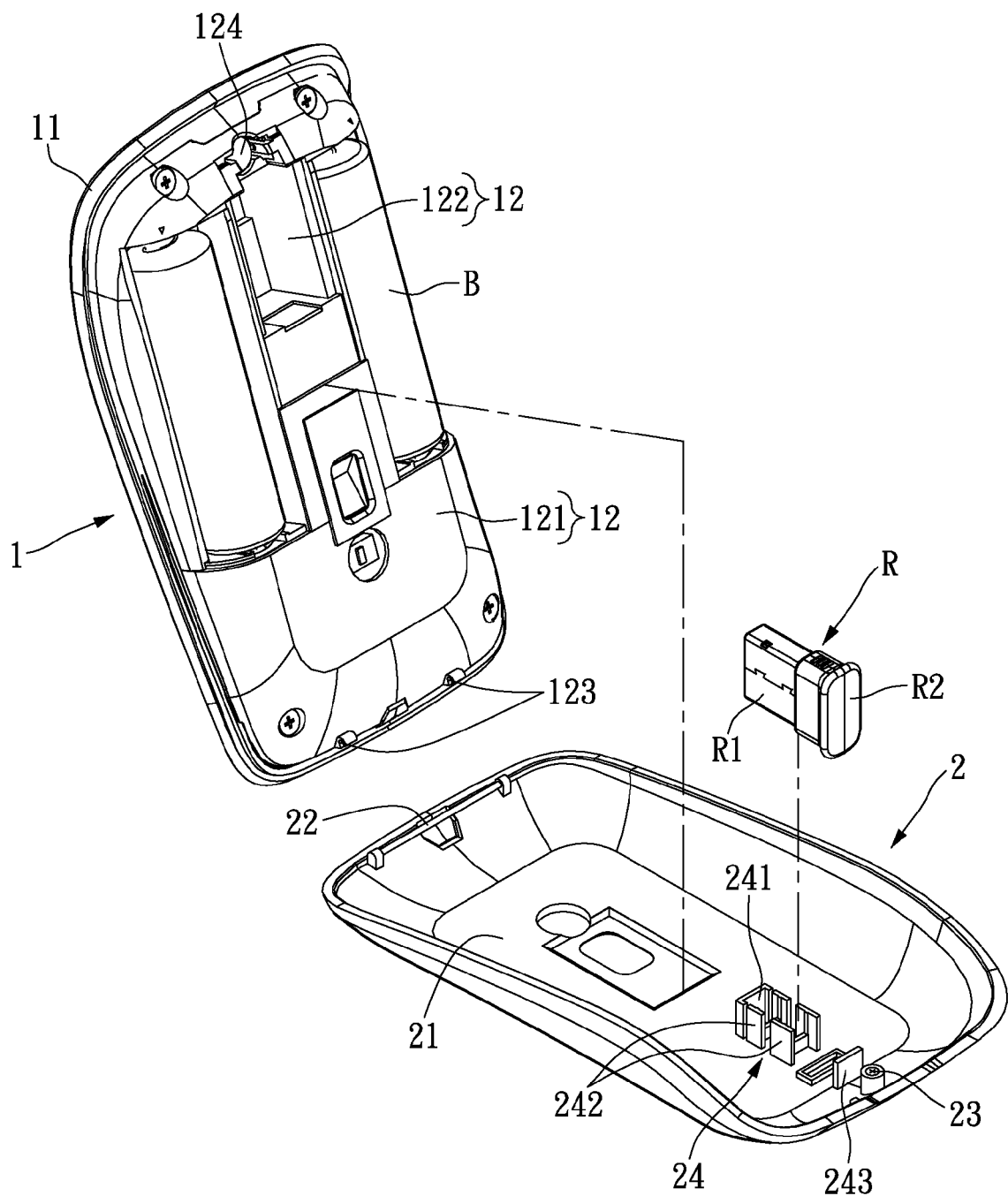
FIG. 5 shows a perspective exploded diagram of a second embodiment of a wireless mouse according to the present disclosure.

FIG. 5 is a perspective exploded diagram of a second embodiment of a wireless mouse according to the present disclosure. The main difference between the present embodiment and the first embodiment is that the first pivot portion 123 on the front end of the lower casing 12 is embodied by a C-shaped fastener, and the second pivot portion 22 on the front end of the cover shell 2 is embodied by a rotating shaft, such that the second pivot portion 22 can be pivoted on the first pivot portion 123. It should be understood that the positions of the C-shaped fastener and the rotating shaft can be mutually exchanged according to design needs. Namely, the C-shaped fastener can be arranged on the cover shell 2 and the rotating shaft can be arranged on the lower casing 12.

Figure 6:
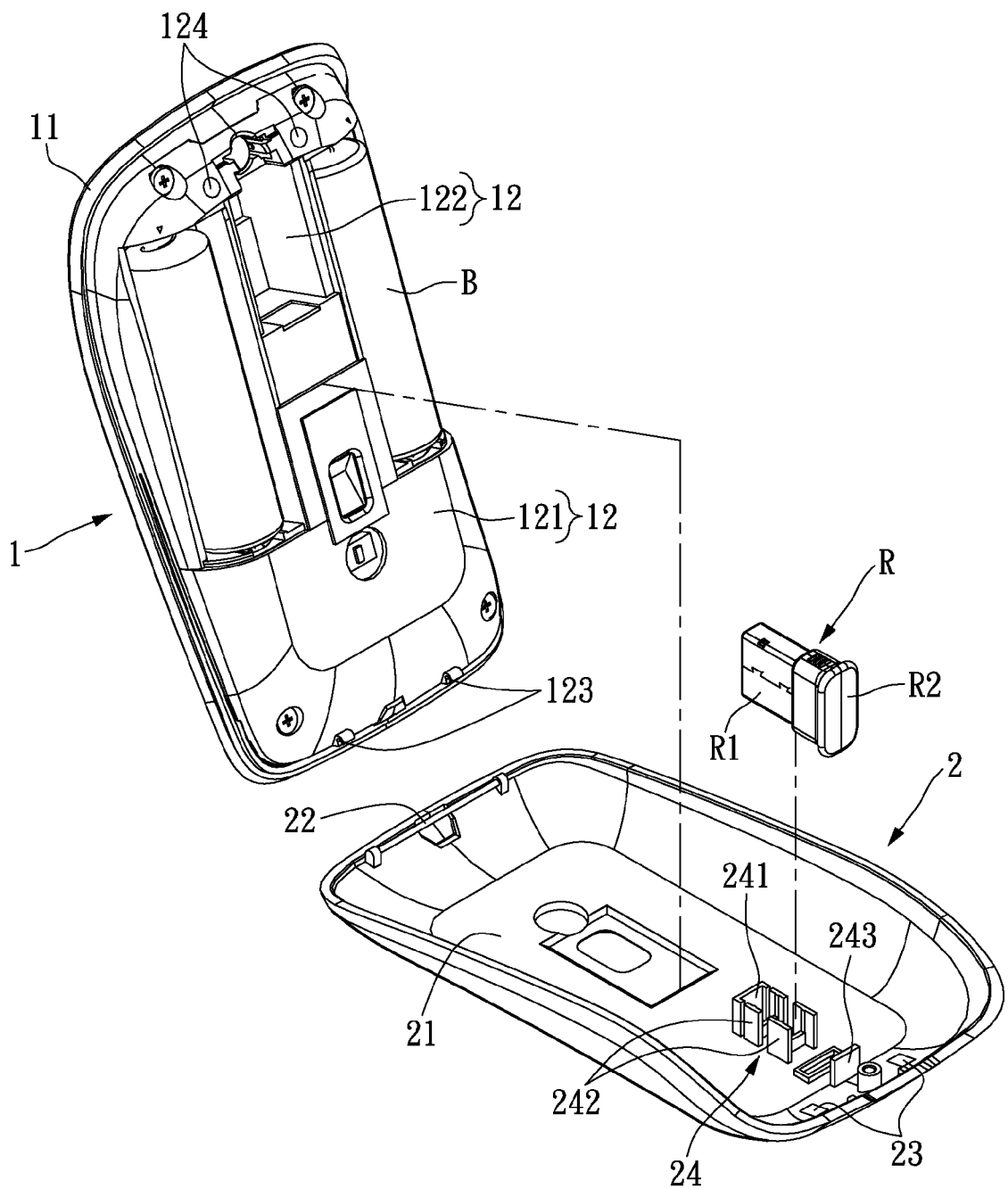
FIG. 6 shows a perspective exploded diagram of a third embodiment of a wireless mouse according to the present disclosure.

FIG. 6 is a perspective exploded diagram of a third embodiment of a wireless mouse according to the present disclosure. The main difference between the present embodiment and the second embodiment is that the first attaching portion 124 on the rear end of the lower casing 12 is embodied by two magnets, and the second pivot portion 23 on the rear end of the cover shell 2 is embodied by two metal plates, such that the second attaching portion 23 can be attached to the first attaching portion 124 by magnetic attraction. Likewise, the positions of the magnets and the metal plates can be mutually exchanged according to design needs. Namely, the magnets can be arranged on the cover shell 2 and the metal plates can be arranged on the lower casing 12.

Figure 7:
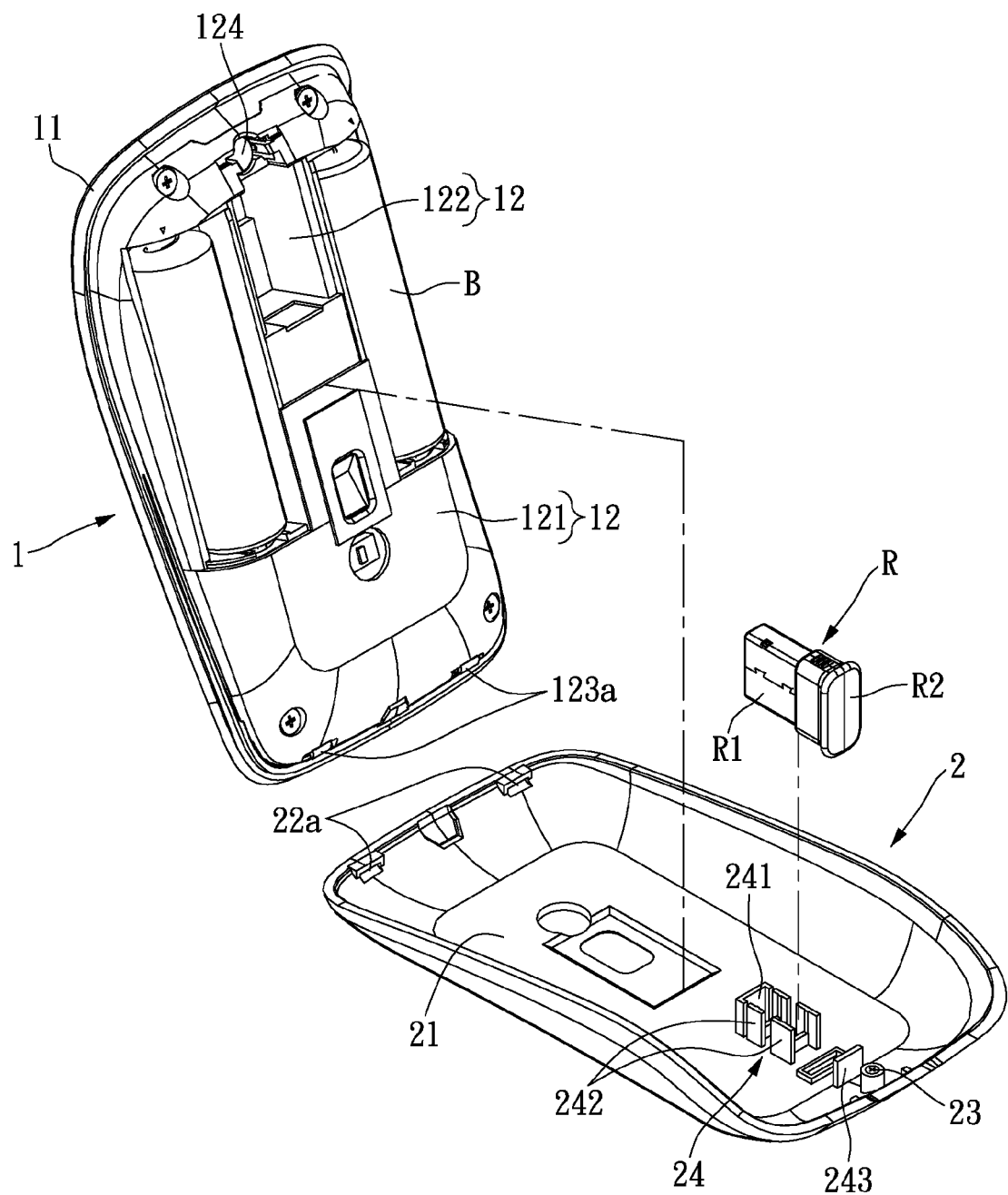
FIG. 7 shows a perspective exploded diagram of a fourth embodiment of a wireless mouse according to the present disclosure.

FIG. 7 is a perspective exploded diagram of a fourth embodiment of a wireless mouse according to the present disclosure. The main difference between the present embodiment and the above embodiment is that one end (the front end in this case) on the outer surface 121 of the lower casing 12 has a first engagement portion 123a, and one end on the inner surface 21 of the cover shell 2 has a second engagement portion 22a corresponding to the position of the first engagement portion 123a. The first engagement portion 123a can be an engagement hook or an engagement block or other engagement elements. The second engagement portion 22a can be an engagement groove or a hook groove or other engagement elements. The engagement hook or the engagement block are used to engage the hook groove or the engagement groove, such that the first engagement portion 123a is engaged to the second engagement portion 22a to form an engagement structure. In the present embodiment, the first engagement portion 123a is embodied by two engagement hooks, the second engagement portion 22a is embodied by two engagement grooves, the first attaching portion 124 is embodied by a magnet, and the second attaching portion 23 is embodied by a screw. However the amounts mentioned are not limiting. The cover shell 2 can be closed upon the outer surface 121 of the lower casing 12 in a separable manner by the corresponding engagement between the second engagement portion 22a and the first engagement portion 123a, and the corresponding attraction between the second attaching portion 23 and the first attaching portion 124. It should be understood that the positions of the engagement hook and the engagement groove, and the positions of the magnet and the screw, can be mutually exchanged according to design needs. When the receiver R is accommodated within the receiving portion 121 (as shown in FIG. 3), and the receiver R is to be used, the cover shell 2 can be pulled downward relative to the lower casing 12 of the mouse body 1. At this moment the second engagement portion 22a is disengaged from the first engagement portion 123a, the second attaching portion 23 is detached from the first attaching portion 124, such that the cover shell separates from the mouse body 1, and the receiver R can be removed from the retaining structure 24 on the inner surface 21 of the cover shell 2.

Figure 8:
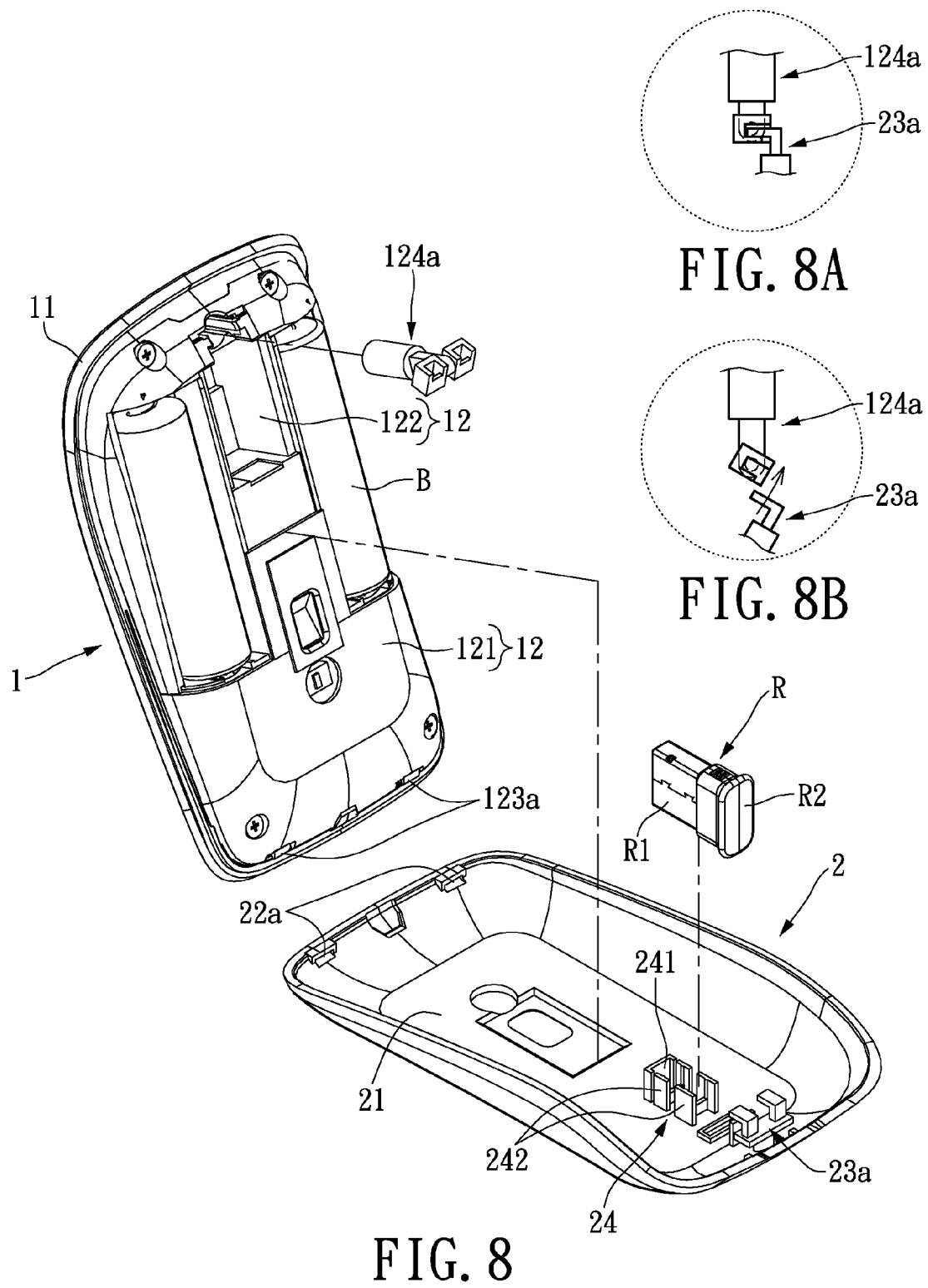
FIG. 8 shows a perspective exploded diagram of a fifth embodiment of a wireless mouse according to the present disclosure.

FIG. 8 is a perspective exploded diagram of a fifth embodiment of a wireless mouse according to the present disclosure. The main difference between the present embodiment and the fourth embodiment is that one end (the rear end in this case) on the outer surface 121 of the lower casing 12 has a third engagement portion 124a, and one end on the inner surface 21 of the cover shell 2 has a fourth engagement portion 23a corresponding to the position of the third engagement portion 124a. In the present embodiment, the third engagement portion 124a is embodied by a push-push switch with two hook grooves (not labeled), and the fourth engagement portion 23a is embodied by two engagement hooks. Therefore, pressing the outer surface of the cover shell 2 once engages the engagement hook to the hook groove of the push-push switch (as shown in FIG. 8A). Pressing the outer surface of the cover shell 2 again disengages the engagement hook from the hook groove of the push-push switch (as shown in FIG. 8B). By this configuration, the fourth engagement portion 23a can be selectively engaged to the third engagement portion 124a. The cover shell 2 can be closed upon the outer surface 121 of the lower casing 12 in a separable manner by the corresponding engagement between the second engagement portion 22a and the first engagement portion 123a, and the corresponding engagement between the fourth engagement portion 23a and the third engagement portion 124a.

Figure 9:
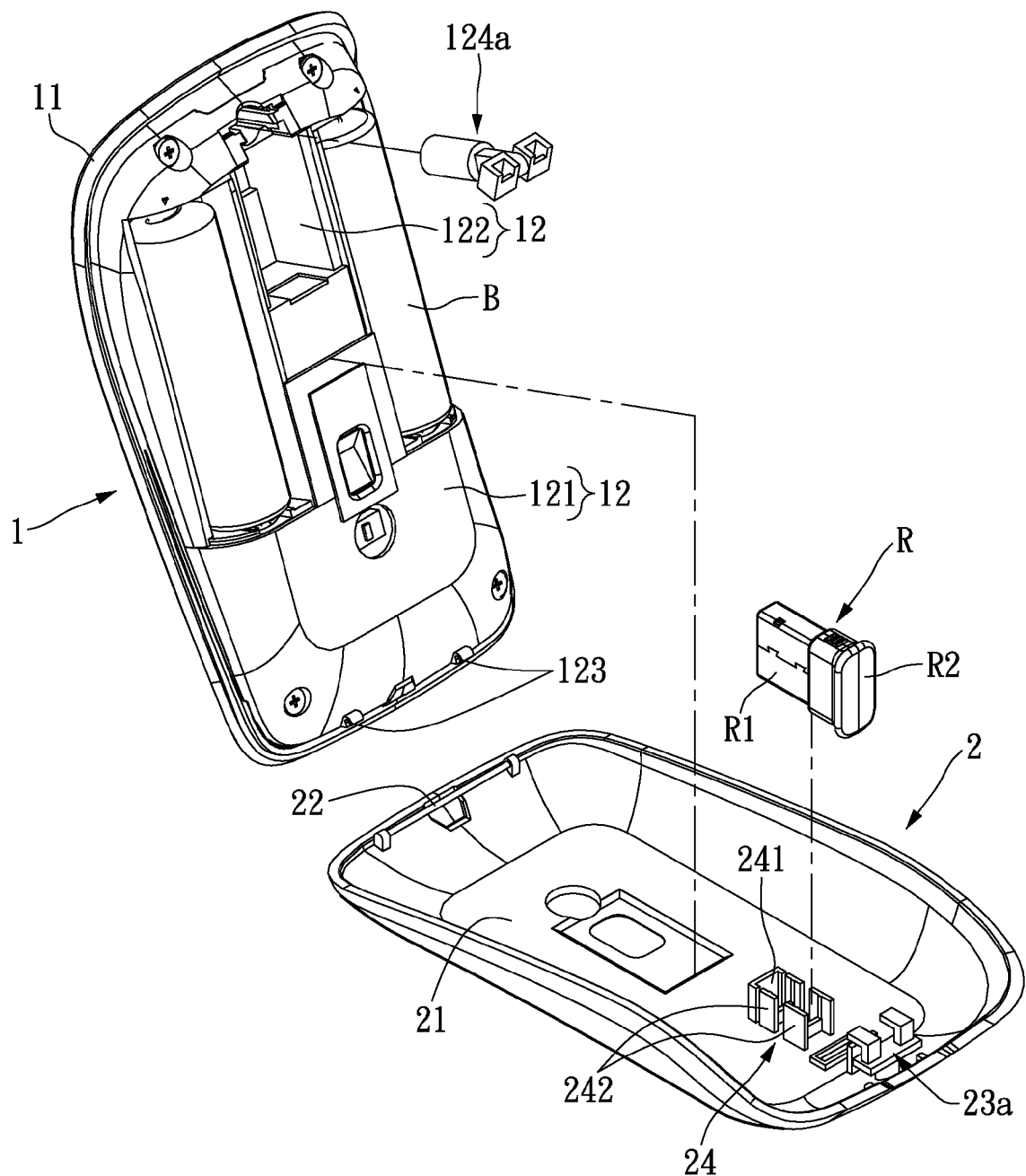
FIG. 9 shows a perspective exploded diagram of a sixth embodiment of a wireless mouse according to the present disclosure.

FIG. 9 is a perspective exploded diagram of a sixth embodiment of a wireless mouse according to the present disclosure. The main difference between the present embodiment and the fifth embodiment is that the front end of the lower casing 12 has a first pivot portion 123, the front end of the cover shell 2 has a second pivot portion 22, and the second pivot portion 22 can pivot on the first pivot portion 123. The cover shell 2 is rotably closed upon the outer surface 122 of the lower casing 12 by the corresponding pivot between the second pivot portion 22 and the first pivot portion 123 and the corresponding engagement between the fourth engagement portion 23a and the third engagement portion 124a.

Figure 10:
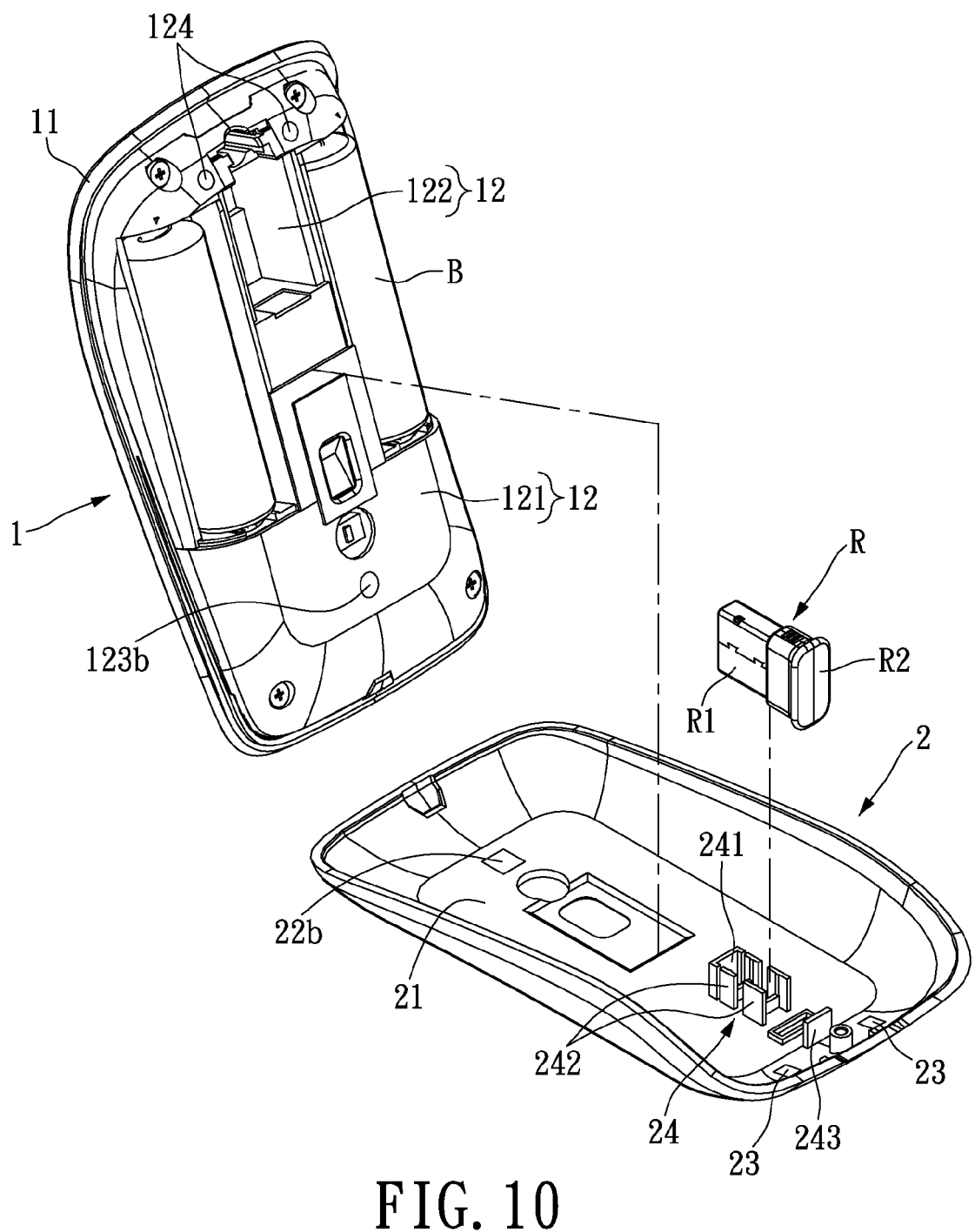
FIG. 10 shows a perspective exploded diagram of a seventh embodiment of a wireless mouse according to the present disclosure.

FIG. 10 is a perspective exploded diagram of a seventh embodiment of a wireless mouse according to the present disclosure. The main difference between the present embodiment and the above embodiment is that one end (the rear end in this case) on the outer surface 121 of the lower casing 12 has a first attaching portion 124, and one end on the inner surface 21 of the cover shell 2 has a second attaching portion 23 corresponding to the position of the first attaching portion 124. The other end (the front end in this case) on the outer surface 121 of the lower casing 12 has a third attaching portion 123b, and the other end on the inner surface 21 of the cover shell 2 has a fourth attaching portion 22b corresponding to the position of the third attaching portion 123b. The first and third attaching portions 124, 123b can each be a magnet. The second and fourth attaching portions 23, 22b can each be a metal plate, a screw, or other metal elements, or another magnet, such that the second and fourth attaching portions 23, 22b can be respectively magnetically attracted to the first and third magnetic portions 124, 123b to form a magnetically attracting structure. In the present embodiment, the first attaching portion 124 is embodied by a magnet, the third attaching portion 123b is embodied by two magnets, the second attaching portion 23 is embodied by a metal plate, and the fourth attaching portion 22b is embodied by two metal plates. The cover shell 2 can be closed upon the outer surface 121 of the lower casing 12 in a separable manner by the corresponding attraction between the second attaching portion 23 and the first attaching portion 124, and the corresponding attraction between the fourth attaching portion 22b and the third attaching portion 123b. It must be mentioned that the screw and metal plate can be screwed onto the cover shell 2, and the magnets can be attached onto the cover shell 2. It should be understood that a plurality of screws or metal plates can be screwed onto the cover shell. Likewise, a plurality of metal plates or magnets can be attached onto the cover shell. The position of these elements can be modified according to design needs, as long as they are arranged on the inner surface 21 of the cover shell 2 and correspond to the position of the magnet arranged on the lower casing 12.

Figure 11:
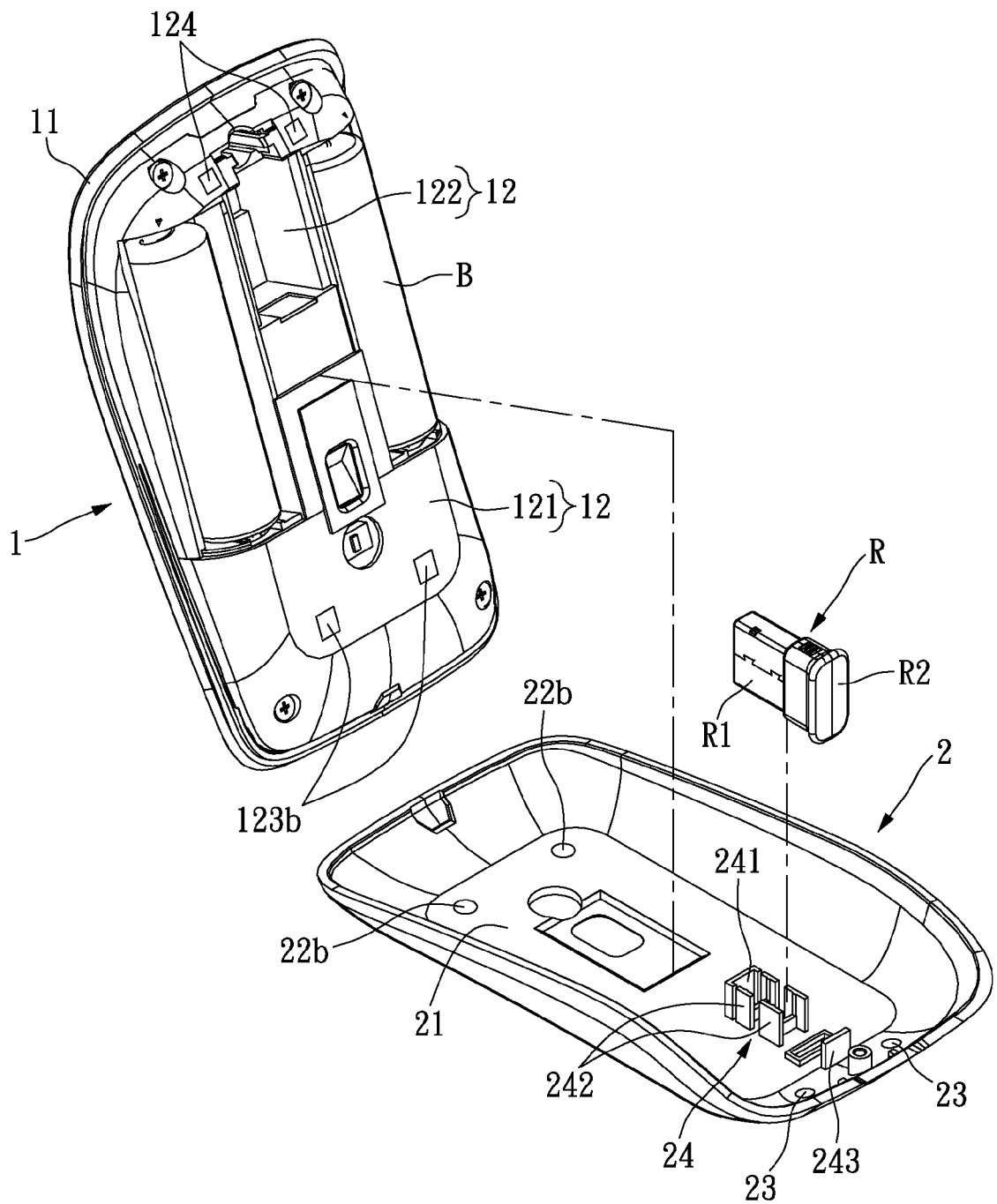
FIG. 11 shows a perspective exploded diagram of an eighth embodiment of a wireless mouse according to the present disclosure.

FIG. 11 is a perspective exploded diagram of an eighth embodiment of a wireless mouse according to the present disclosure. The main difference between the present embodiment and the seventh embodiment is that the first and third attaching portions 124, 123b arranged on the lower casing 12 are each embodied by two metal plates, and the second and fourth attaching portions 23, 22b arranged on the cover shell 2 are each embodied by two magnets. However the above quantities are not limited. The present embodiment and the seventh embodiment directly use a magnetically attracting structure so that the cover shell 2 is retained on the lower casing 12, simplifying the overall structure and avoiding problems of wear and damage inherent to conventional engagement methods.

In summary, the present disclosure provides a wireless mouse which can accommodate the receiver within the receiving portion or expose the receiver on the cover shell as the cover shell rotates about the mouse body, or expose the receiver on the cover shell when the cover shell separates from the mouse body, by using a design featuring both retaining of the receiver onto the cover shell, and a pivot structure, a magnetically attracting structure or an engagement structure. Thusly, the receiver is more conveniently stored and picked up. Additionally, the structure of the cover shell matches the structure of the lower casing such that when the cover shell is closed upon the lower casing of the mouse body, the cover shell and the mouse body appear to be integrally formed, providing a wireless mouse with an integrally formed appearance and a convenient storage solution for receivers.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:
1. A wireless mouse adaptable to accommodating a receiver, comprising:
   a mouse body having an upper casing and a lower casing fixed to the upper casing, the lower casing having a receiving portion; and
   a cover shell selectively closed upon the lower casing such that the receiver can be selectively retained on the cover shell and corresponds to the position of the receiving portion;
   wherein a dimension of the cover shell is substantially equal to that of the lower casing;
   wherein one end of the lower casing has a first engagement portion, the other end of the lower casing has a first attaching portion, one end of the cover shell has a second engagement portion corresponding the position of the first engagement portion, the other end of the cover shell has a second attaching portion corresponding to the position of the first attaching portion, and the cover shell can be closed upon an outer surface of the lower casing in a separable manner by the correspondence between the second engagement portion and the first engagement portion and the correspondence between the second attaching portion and the first attaching portion;
   wherein when the receiver is retained on the cover shell and the cover shell is closed upon the lower casing, the receiver is accommodated within the receiving portion.

2. The wireless mouse according to claim 1, wherein an inner surface of the cover shell has a retaining structure corresponding to the position of the receiving portion for retaining the receiver.

3. A wireless mouse adaptable to accommodating a receiver, comprising:
   a mouse body having an upper casing and a lower casing fixed to the upper casing, the lower casing having a receiving portion; and
   a cover shell selectively closed upon the lower casing such that the receiver can be selectively retained on the cover shell and corresponds to the position of the receiving portion;
   wherein a dimension of the cover shell is substantially equal to that of the lower casing;
   wherein one end of the lower casing has a first attaching portion, one end of the cover shell has a second attaching portion corresponding to the position of the first attaching portion, the other end of the lower casing has a third attaching portion, the other end of the cover shell has a fourth attaching portion corresponding to the position of the third attaching portion, and the cover shell can be closed upon an outer surface of the lower casing in a separable manner by the correspondence between the second attaching portion and the first attaching portion and the correspondence between the fourth attaching portion and the third attaching portion;
   wherein when the receiver is retained on the cover shell and the cover shell is closed upon the lower casing, the receiver is accommodated within the receiving portion.

4. The wireless mouse according to claim 3, wherein an inner surface of the cover shell has a retaining structure corresponding to the position of the receiving portion for retaining the receiver.

5. A wireless mouse adaptable to accommodating a receiver, comprising:
   a mouse body having an upper casing and a lower casing fixed to the upper casing, the lower casing having a receiving portion; and
   a cover shell selectively closed upon the lower casing such that the receiver can be selectively retained on the cover shell and corresponds to the position of the receiving portion;
   wherein a dimension of the cover shell is substantially equal to that of the lower casing;
   wherein one end of the lower casing has a first engagement portion, one end of the cover shell has a second engagement portion corresponding to the position of the first engagement portion, the other end of the lower casing has a third engagement portion, the other end of the cover shell has a fourth engagement portion corresponding to the position of the third engagement portion, and the cover shell can be closed upon the outer surface of the lower casing in a separable manner by the correspondence between the second engagement portion and the first engagement portion and the correspondence between the fourth engagement portion and the third engagement portion;
   wherein when the receiver is retained on the cover shell and the cover shell is closed upon the lower casing, the receiver is accommodated within the receiving portion.

6. The wireless mouse according to claim 5, wherein an inner surface of the cover shell has a retaining structure corresponding to the position of the receiving portion for retaining the receiver.

* * * * *